United States Patent
Minnich et al.

(10) Patent No.: US 10,750,668 B1
(45) Date of Patent: Aug. 25, 2020

(54) SELF-CLEANING UNLOADER ASSEMBLY

(71) Applicant: CNH Industrial America LLC, New Holland, PA (US)

(72) Inventors: Michael Minnich, Elizabethtown, PA (US); Karl R. Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/507,751

(22) Filed: Jul. 10, 2019

(51) Int. Cl.
  *A01D 41/127* (2006.01)
  *A01D 41/12* (2006.01)
  *A01F 12/46* (2006.01)
(52) U.S. Cl.
  CPC .......... *A01D 41/1217* (2013.01); *A01F 12/46* (2013.01)
(58) Field of Classification Search
  CPC .............................. B60P 1/36; A01D 41/1271
  USPC ....................................................... 414/523
  See application file for complete search history.

(56) References Cited

U.S. PATENT DOCUMENTS

| | | |
|---|---|---|
| 5,100,281 A | 3/1992 | Grieshop |
| 5,359,838 A | 11/1994 | Madsen |
| 5,906,471 A * | 5/1999 | Schwoerer ............. B65G 33/32 222/413 |
| 6,042,326 A | 3/2000 | Thomas et al. |
| 6,638,159 B2 | 10/2003 | Krone et al. |
| 6,718,746 B2 * | 4/2004 | Hettiger ............... A01D 43/087 37/261 |
| 7,494,409 B2 | 2/2009 | Voss et al. |

FOREIGN PATENT DOCUMENTS

| | | |
|---|---|---|
| DE | 102009042371 A1 | 3/2011 |
| RU | 2013038 C1 | 5/1994 |
| RU | 2091292 C1 | 9/1997 |

* cited by examiner

*Primary Examiner* — Saul Rodriguez
*Assistant Examiner* — Willie Berry, Jr.
(74) *Attorney, Agent, or Firm* — Peter Zacharias; Patrick Sheldrake

(57) ABSTRACT

A crop unloader having a frame, an unloader tube mounted to the frame, a driven gear fixed to the unloader tube and having driven teeth extending radially from a first axis, a drive gear mounted to the frame and having drive teeth extending radially from a second axis and extending to mesh at an engagement location with the driven teeth during rotation of the drive gear about the second axis, and a motor operable to rotate the drive gear to rotate the driven gear to move the unloader tube between a first position about the first axis and a second position about the first axis. The teeth form a tapered gap at the engagement location, the tapered gap extending from an upper end to a lower end and being larger at the lower end than at the upper end. An agricultural combine having the crop unloader is also provided.

20 Claims, 4 Drawing Sheets

SELF-CLEANING UNLOADER ASSEMBLY

BACKGROUND OF THE INVENTION

A variety of agricultural machines include a conveyor system for transporting crop or other material from one location to another. For example, an agricultural combine typically has an unloader device that is used to unload grain from a grain tank on the combine to an external grain cart or other receptacle. A typical unloader includes a hollow passage having a crop moving device therein, such as one or more auger screws or conveyors. Movement of the auger screw or conveyor carries the material along the length of the housing until it is expelled out the end of the housing.

In some cases, an unloader may be fixed in place to a housing, but it is common for the unloader to be movable to different orientations. For example, an unloader might be movable to distribute material in different directions (e.g., to different receptacles surrounding the material supply. As another example, an unloader might be movable between a stowed position and an operative position. This latter configuration is typical on agricultural combines, which operate with the unloader in a stowed position during some of the harvesting process, and then move the unloader to the operative position extending laterally from the combine to direct crop material to a support truck or grain cart that is operated alongside the combine. This movable mounting can help protect the unloader when it is not in use, and to allow the equipment to be more maneuverable and to navigate through smaller spaces. Examples of agricultural machines having a movable unloading mechanism are shown in U.S. Pat. Nos. 7,494,409; 6,718,746; 6,638,159; 6,042,326; 5,359,838; and 5,100,281 which are incorporated herein by reference.

The inventors have determined that the state of the art still requires further advancement, particularly insofar as known unloading devices often are subject to excessive fouling by crop material, which can lead to damage or excessive service requirements.

This description of the background is provided to assist with an understanding of the following explanations of exemplary embodiments, and is not an admission that any or all of this background information is necessarily prior art.

SUMMARY OF THE INVENTION

In one exemplary aspect, there is provided a crop unloader having a frame, an unloader tube mounted to the frame by a rotating joint to be movable about a first axis relative to the frame, a driven gear fixed to the unloader tube in a plane perpendicular to the first axis and having driven teeth extending radially from the first axis, and a drive gear mounted to the frame and rotatable about a second axis that is parallel to the first axis. The drive gear has drive teeth extending radially from the second axis and extending to mesh at an engagement location with the driven teeth during rotation of the drive gear about the second axis. A motor is fixed to the frame and operatively connected to the drive gear. The motor is operable to rotate the drive gear to rotate the driven gear to move the unloader tube between a first position about the first axis and a second position about the first axis. The drive teeth and the driven teeth are configured to form a tapered gap at the engagement location, the tapered gap extending from an upper end to a lower end and being larger at the lower end than at the upper end.

In another exemplary aspect, there is provided an agricultural combine having a chassis configured for movement on a surface, a header assembly attached to the chassis, a threshing and separating system attached to the chassis, a hopper located on the chassis and configured to retain crop material therein, and a crop unloader. The crop unloader has a frame attached to the chassis, an unloader tube mounted to the frame by a rotating joint to be movable about a first axis relative to the frame, a driven gear fixed to the unloader tube in a plane perpendicular to the first axis and having driven teeth extending radially from the first axis, and a drive gear mounted to the frame and rotatable about a second axis that is parallel to the first axis. The drive gear has drive teeth extending radially from the second axis and extending to mesh at an engagement location with the driven teeth during rotation of the drive gear about the second axis. A motor is fixed to the frame and operatively connected to the drive gear. The motor is operable to rotate the drive gear to rotate the driven gear to move the unloader tube between a first position about the first axis and a second position about the first axis. The drive teeth and the driven teeth are configured to form a tapered gap at the engagement location, the tapered gap extending from an upper end to a lower end and being larger at the lower end than at the upper end.

In any aspect, each adjacent pair of driven teeth may be joined by a respective bottom land having an upper portion at a first distance from the first axis and a lower portion at a second distance from the first axis, the first distance being greater than the second distance, and the tapered gap is formed between the bottom land and a respective top land of one of the drive teeth located between the respective adjacent pair of driven teeth.

In any aspect, each driven tooth may comprise an inclined top land having an upper portion at a first distance from the first axis and a lower portion at a second distance from the first axis, the first distance being greater than the second distance, and the tapered gap is formed between the inclined top land and a bottom land between two adjacent drive teeth.

In any aspect, the crop unloader may have an evacuation plate attached to and movable with the unloader tube, the evacuation plate being offset from the first axis, and positioned to be adjacent and below the engagement location when the unloader tube is at a predetermined position relative to the first axis. The evacuation plate may be movably mounted to the unloader tube to be movable between an extended position in which the evacuation plate extends outward from the first axis and a retracted position in which the evacuation plate is oriented along a circumference surrounding the first axis. The evacuation plate may be configured to be flush with an adjacent portion of the unloader tube when the evacuation plate is in the retracted position. The evacuation plate may be located below the driven gear and an adjacent surface of the frame.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide unloaders which may be used in agricultural equipment (e.g., combines, grain carts, etc.), or in other environments. Such devices are expected to be particularly useful on agricultural equipment in which the unloader can be exposed to crop material loading, but the invention is not limited to any particular application except as recited in the claims.

Figure 1:
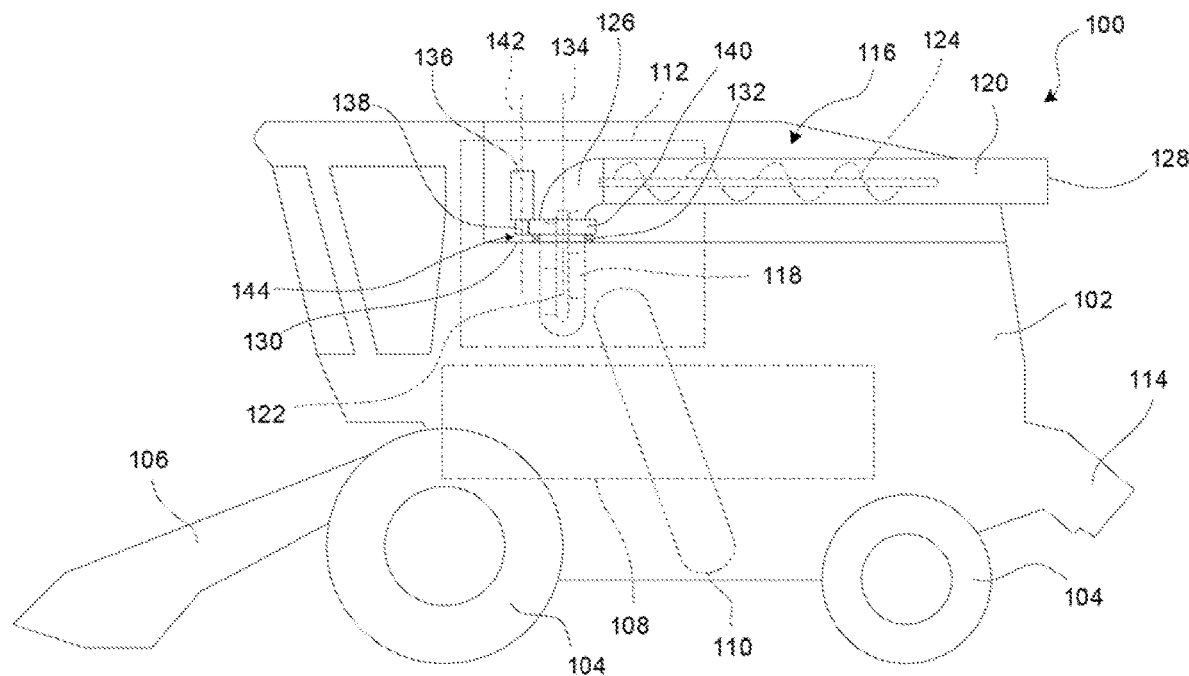
FIG. 1 schematically illustrates an example of an agricultural combine having a movable unloader.

Referring to FIG. 1, an example of an agricultural combine 100 is schematically illustrated. The combine 100 includes a chassis 102 that is supported for movement on the ground by wheels 104 or tracks. A header assembly 106 is attached to the combine 100 and configured to receive crop material and covey such material to a threshing and separating system 108 located in or on the chassis 102. The threshing and separating system 108 separates grain from the remaining crop material (also known as "material other than grain" or "MoG") and a grain elevator 110 conveys the grain to a grain hopper 112. The MoG is discharged from the back of the combine through one or more openings, which may include a spreader 114 to better distribute the MoG on the ground. The operation and construction of the foregoing components of the combine 100 are well-known in the art and need not be described in greater detail herein.

The combine 100 also includes an unloader system 116 comprising one or more tubes through which the grain is evacuated from the grain hopper 112 by conveyor belts, augers, or the like. The unloader system 116 includes a first tube 118 that is positioned to receive grain from the grain hopper 112, and a second tube 120 that receives grain from the first tube 118 and conveys it to an external container such as a grain truck, grain cart, or fixed container. Similar or dissimilar conveying mechanisms may be provided in the first tube 118 and the second tube 120. For example, both tubes 118, 120 may include conveyors or augers, or one may include an auger while the other includes a conveyor. In this example, the first tube 118 has a conveyor 122, and the second tube 120 has an auger 124. The first tube 118 and the second tube 120 are connected by an elbow tube 126, which turns the flow of grain through an angle (e.g. about 90 degrees). The elbow tube 126 can be integrally formed (i.e., unitary) with either tube 118, 120, or provided as a separate connected part. The tubes 118, 120, 126 may have any cross-sectional profile, but a circular profile is typical. It will also be understood that the tubes 118, 120, 126 may be segmented into separate attached parts, with any variety of articulating joints between the segments, and one or more tubes 118, 120, 126 may comprise a flexible passage.

Figure 2A:
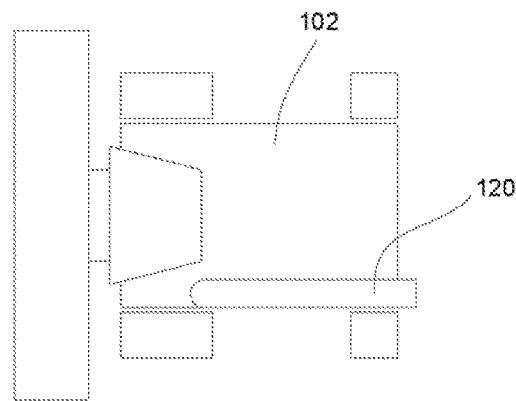
FIGS. 2A and 2B schematically illustrate a combine having crop unloader in a stowed position and an operative position, respectively.
Figure 2B:
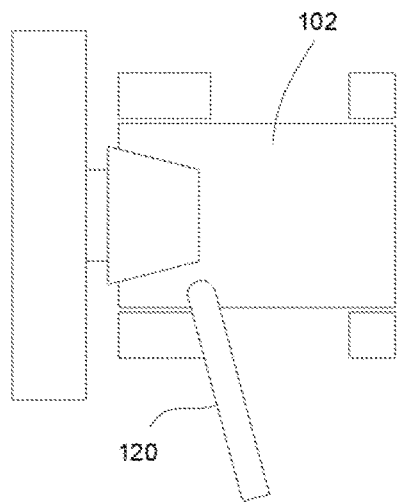
Figure 3:
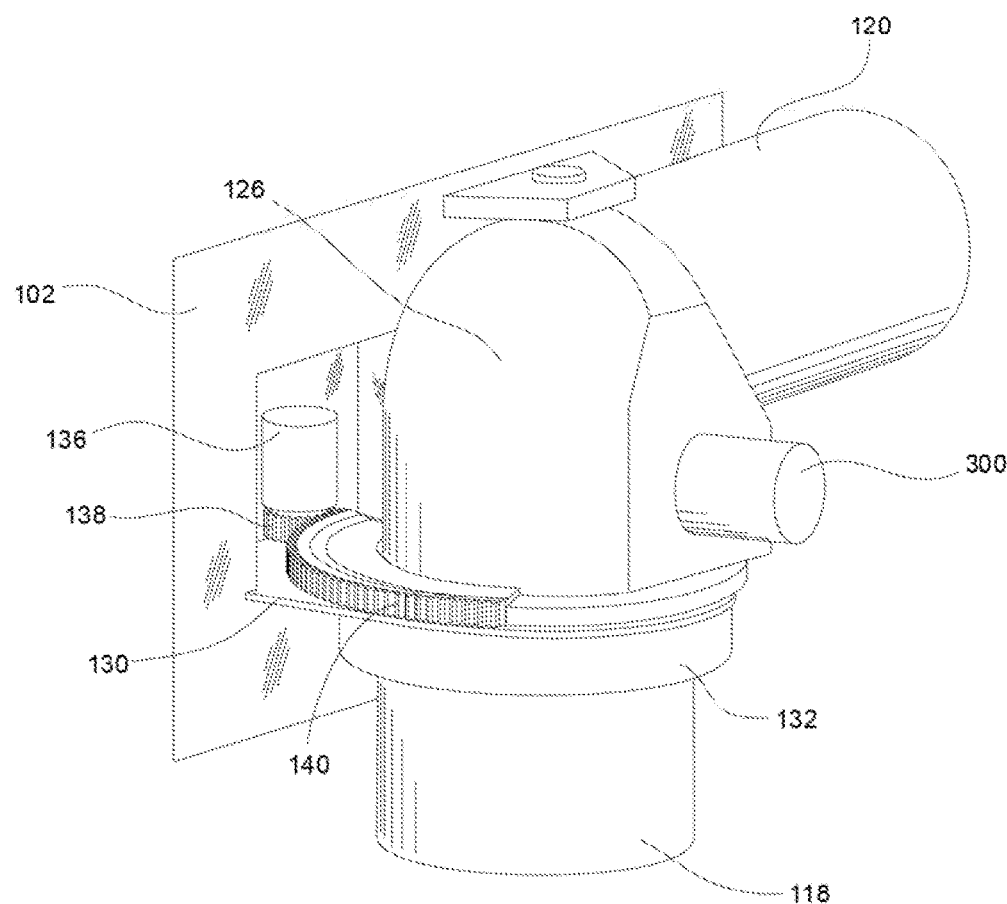
FIG. 3 illustrates an example of a rotating joint for connecting an unloader assembly to a combine or other vehicle, and related parts and devices.

The second tube 120 is movable relative to the chassis 102 between a first position (FIG. 2A) in which the second tube 120 is stored alongside the chassis 102, to second position (FIG. 2B) in which second tube 102 extends laterally from the chassis 102. In the second position, the discharge end 128 of the second tube 102 is positioned to deposit grain to a grain truck or other receptacle located alongside the combine 100.

To provide this motion, all or some of the unloader system's tubes 118, 120, 126 are connected a stationary frame 130 by a rotating joint 132. The frame 130 may be part of the chassis 102 or a separate structure that is connected to the chassis 102. The rotating joint 132 may comprise any suitable arrangement or bushings, bearings or other mechanisms that permit rotation about an axis. In the shown example, the rotating joint 132 is rotatable about a first axis 134. The first axis 134 may be oriented vertically (i.e., along the gravitational axis) when the combine 100 is located on horizontal ground and the frame 130 is oriented parallel to the horizontal ground, or it may be tilted relative to vertical, such as at an angle of 11 degrees from vertical. Such vertical orientation is not strictly necessary, and some deviation from the vertical direction may be present as the combine 100 moves over undulating terrain.

In this example, the rotating joint 132 connects the bottom of the elbow tube 126 to the frame 130. However, it will be appreciated that it is not strictly necessary for the rotating joint to be located at an elbow tube 126. For example, the rotating joint can be located along the length of the first tube 118, with the downstream end of the first tube 118 protruding above the frame 130. Other alternatives and variations will be apparent to persons of ordinary skill in the art in view of the present disclosure.

The angular position of the unloader's second tube 120 relative to the frame 130 and chassis 102 is controlled by a motor 136. The motor 136 may comprise an electric motor, hydraulic motor, pneumatic motor, a power take-off from a combustion engine, or the like. The motor 136 is attached to a drive gear 138, either directly or via one or more linkages or power transmissions. The drive gear 138 is positioned to mesh with a corresponding driven gear 140, which is fixed to the unloader system 116. In this case, the driven gear 140 is fixed to the bottom end of the elbow tube 126. Thus, rotation of the motor 136 in either direction causes the elbow tube 126 and second tube 120 to rotate between the first position and the second position. If the first tube 118 is rigidly connected to the elbow tube 126, then the first tube 118 will also rotate along with the other tubes and the driven gear 140.

The driven gear 140 may be fixed to the unloader system 116 in a plane that is perpendicular to the first axis 134, so that the driven gear rotates symmetrically about the first axis 134. Similarly, the drive gear 138 is fixed to the frame 130 (such as by a layshaft and bearings or simply by its connection to the motor 136) to rotate about a second axis 142 that is parallel to the first axis 134.

It is noted that the first axis 134 is collinear with the rotation axis of the driven gear 140 and a center axis of the first tube 118. This arrangement is not strictly required, but it does facilitate a simpler interface between the first tube 118 and the elbow tube 126. Nevertheless, it is envisioned that the first axis 134 may be offset axis from the center axis of the first tube 118 in other embodiments.

During operation, some or all of the driven gear 140 is exposed to crop material. For example, grain and MoG might fall onto the driven gear 140 or be deposited there by airflow around the combine 100. Such material can cling to the driven gear 140, particularly if there is exposed lubricant on the driven gear 140. The drive gear 138 may be similarly exposed. Such deposits of crop material can impede the efficient rotating operation of the unloader system 116, such as by causing higher power requirements to crush the crop material between the gears 138, 140. These deposits can also lead to higher maintenance costs to clean the gears 138, 140 and nearby portions of the combine. These deposits can also cause premature wear of the gear faces and lead to gear teeth breaking or jamming. These problems can be exacerbated by the location of the gears 138, 140 in close proximity to the underlying frame 130. For example, in some cases, there may be a space 144 between the underside of one or both gears 138, 140 and an adjacent surface of the frame 130. Even if the crop material passes by the gears 138, 140 without clinging to them, the crop material can accumulate in this space 144 and build up over time to interfere with the gears 138, 140.

FIGS. 3-5B illustrate aspects of a first embodiment that may help mitigate the problem of crop material accumulation on and around the gears 138, 140. Here, it is shown that the unloader system 116 is pivotally connected to the frame 130 by a rotating joint 132 in the form of a sleeve bearing or the like. The first tube 118 is located below and rigidly fixed to the frame 130. The elbow tube 126 is located above the frame 130, and rotatably coupled to the first tube 118 and/or frame 130 by the rotating joint 132. Alternatively, the first tube 118 may be rigidly connected to the elbow tube 126, with the rotating joint being between the frame 130 and one or both of the first tube 118 and the elbow tube 126. The motor 136 is mounted to the frame 130 (or directly to the chassis 102), and may be located behind a panel to prevent undue exposure to crop material and the elements. The drive gear 138 is positioned below the motor 136 and affixed to the motor's driveshaft. The driven gear 140 extends partially around the circumference of the elbow tube 126, but it alternatively could extend all the way around the elbow tube 126.

Figure 4:
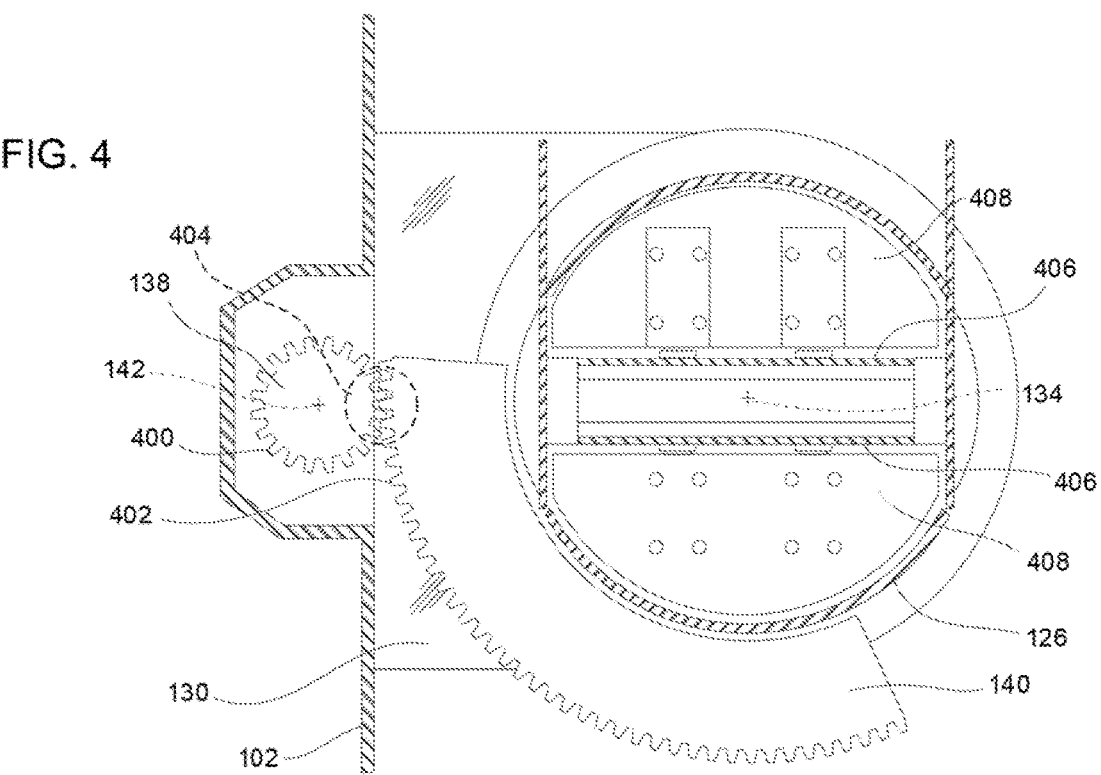
FIG. 4 is a cross-sectional top plan view of the embodiment of FIG. 3.

As best shown in FIG. 4, the drive gear 138 has a plurality of drive teeth 400 that extend radially from the second axis 142. Similarly, the driven gear 140 has a plurality of driven teeth 402 that extend radially from the first axis 134. The drive teeth 400 and driven teeth 402 may comprise any suitable profile shape. For example, they may comprise spur gears (as shown), helical gears, herringbone (double helical) gears, and so on. The drive teeth 400 extend to mesh with the driven teeth 402 at an engagement location 404 during rotation of the drive gear 138 about the second axis 142. The engagement location 404 is a region of space located between the first axis 134 and the second axis 142, and includes the space between the gears 138, 140 at locations within their range of motion in which the drive teeth 400 and driven teeth 402 contact one another. As will be appreciated, the drive teeth 400 and driven teeth 402 do not contact one another outside the engagement location 404. Within the engagement location 404, the drive teeth 400 and driven teeth 402 generally contact each other along their side faces, preferably with their side faces in rolling contact, and their top lands and roots remaining spaced from one another, as known in the art.

Figure 5A:
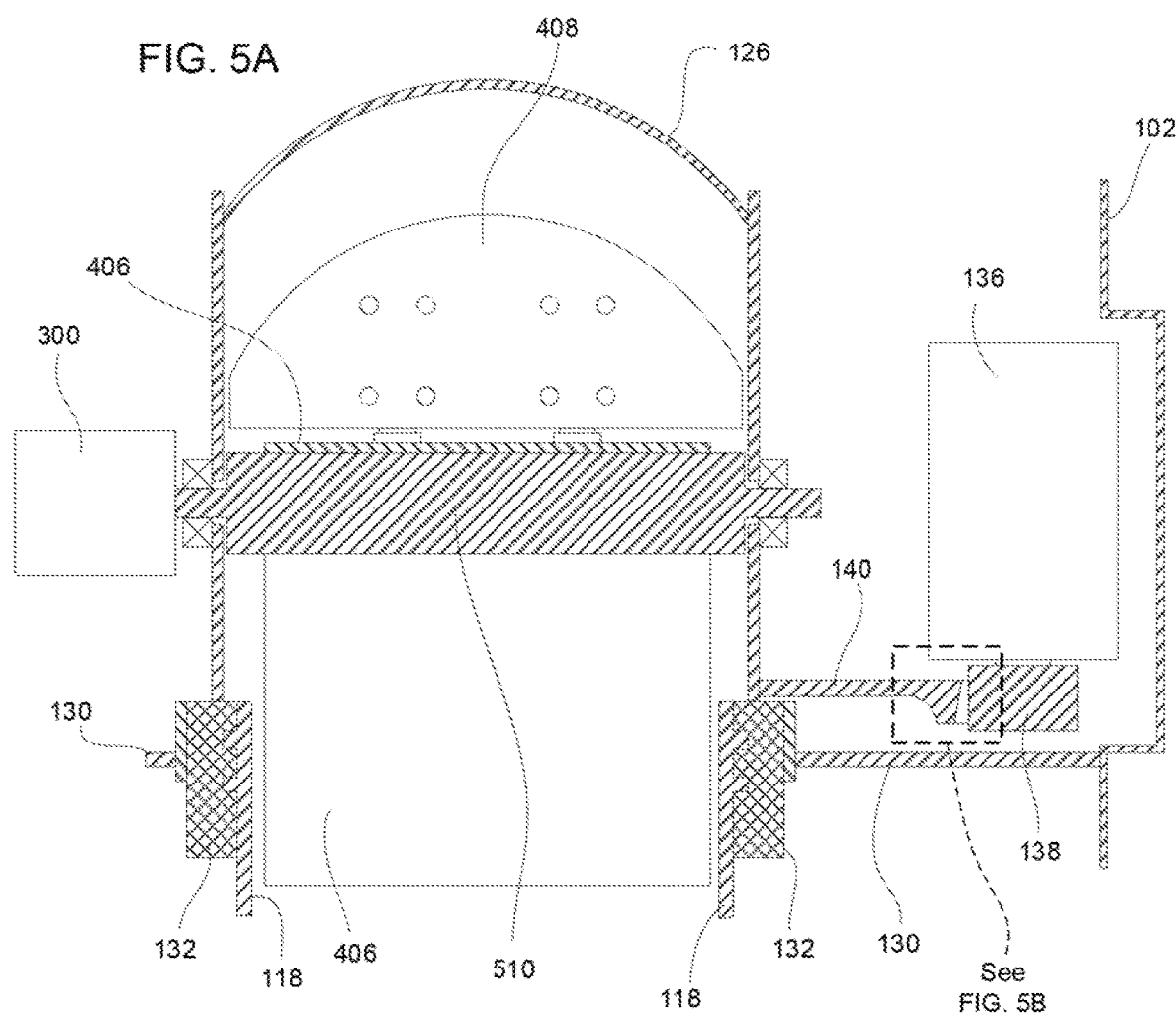
FIG. 5A is a cross-sectional elevation view of the embodiment of FIG. 3.
Figure 5B:
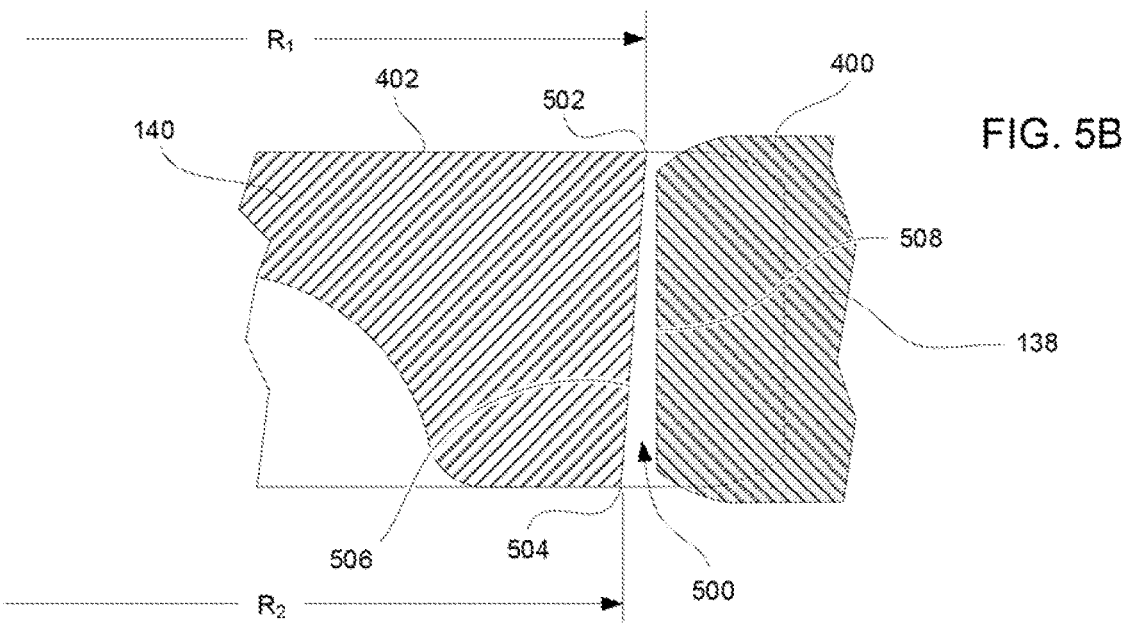
FIG. 5B is a detail of FIG. 5A showing a configuration of gears that may be used in embodiments.

Referring to FIGS. 5A and 5B, the drive teeth 400 and driven teeth 402 are configured to form a tapered gap 500 at the engagement location 404. The tapered gap 500 extends from an upper end 502 to a lower end 504, and is larger at the lower end 504 than at the upper end 502. It will be understood that the upper end 502 is located above the lower end 504 with respect to the gravitational direction, but it is not strictly required for the upper end 502 to be directly below the lower end 504. For example, the drive teeth 400 and driven teeth 402 may comprise helical profiles in which the upper end of each tooth is angularly offset from the lower end, or the first and second axes 134, 142 may be inclined relative to the gravitational vertical direction (either as mounted on the combine 100 or during motion of the combine 100 over undulating terrain).

The tapered gap 500 is expected to apply a downward force vector to crop material caught between the teeth 400, 402 within the engagement location 404. Such force tends to drive the crop material downward, and out of the teeth 400, 402. Thus, the engagement of the teeth 400, 402 acts to remove crop material from between the gears 138, 140.

The tapered gap 500 may be formed in any suitable way. For example, one or more of the gear sides, bottom lands and top lands may have a vertically-tapered profile to create the tapered gap. For clarity, it will be understood that the gear teeth "bottom lands" are the regions between adjacent gear teeth that do not contact any portion of the opposing gear tooth (also called the "roots"), the "top lands" are the distal edges of the teeth that face but do not contact the roots of the opposing gear teeth, and the "sides" are the side portions of the gear teeth that contact opposing sides of opposing gear teeth to transmit power (also called the "face" and "flank"). The sides could be provided with a tapered profile, however, this profile could interfere with smooth operation of the gears 138, 140 and might lead to premature wear. If the sides are profiled, the tapered profile preferably does not extend along the entire height of the gear side, so as to prevent the generation of excessive point contact forces.

More preferably, the top lands or the bottom lands are provided with the tapered profile to form the tapered gap 500. For example, in the embodiment of FIGS. 5A and 5B, each adjacent pair of driven teeth 402 is joined by a respective bottom land 506 having an upper portion at a first distance $R_1$ from the first axis 134, and a lower portion at a second distance $R_2$ from the first axis 134, and the first distance $R_1$ is greater than the second distance $R_2$. Thus, the tapered gap 500 is formed between the inclined bottom land 506 and a top land 508 of one of the drive teeth 400 located between the adjacent pair of driven teeth 402.

Figure 6:
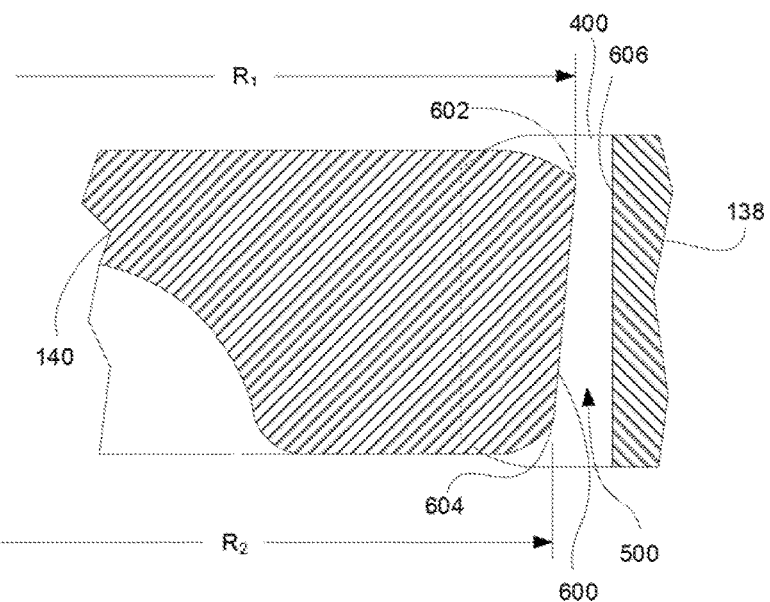
FIG. 6 illustrates an alternative example of gears that may be used in embodiments.

Alternatively, as shown in FIG. 6, driven tooth 402 may have an inclined top land 600 having an upper portion 602 at a first distance $R_1$ from the first axis and a lower portion 604 at a second distance $R_2$ from the first axis. In this case, first distance $R_1$ is again greater than the second distance $R_2$. Thus, the tapered gap 500 is formed between the inclined top land 600 and a bottom land 606 between two adjacent drive teeth 400.

In other embodiments, the drive teeth 400 may have a tapered top land or a tapered bottom land. The illustrations in FIGS. 5B and 6 essentially show such configurations if one considers the driven tooth 402 to be the drive tooth 400, and the drive tooth 400 to be the driven tooth 402. In other embodiments, the driven teeth 402 or the drive teeth 400 may have both tapered bottom lands and tapered top lands. In still other embodiments, both gears 138, 140 may have teeth with one or more tapered profiles.

FIGS. 3-5A also show an exemplary conveyor 122 mounted to the elbow tube 126. The conveyor 122 comprises a flexible drive 406, such as one or more belts or chains, having paddles 408 extending therefrom. The flexible drive 406 is wrapped around an upper axle 510 in the elbow tube 135, and extends downward to a lower axle (not shown) located within the first tube 118. A motor 300 (in this case a hydraulic motor) is connected to the upper axle 510 to drive the flexible drive 406. As the flexible drive 406 moves, the paddles 408 convey grain up to the second tube 120.

Figure 7:
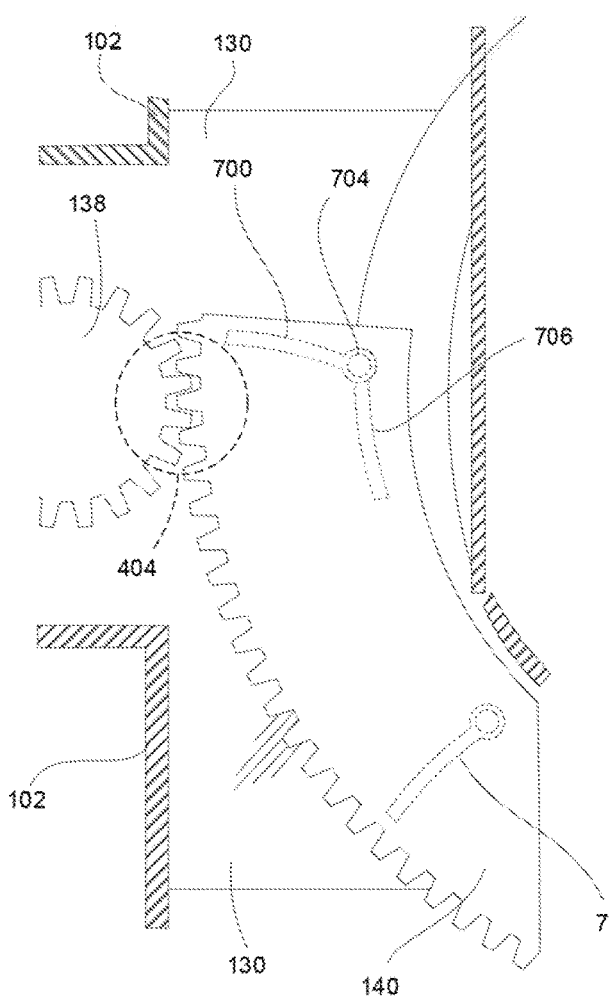
FIG. 7 is a cross-sectional top plan view of another embodiment of a rotating joint that may be used in embodiments.
Figure 8:
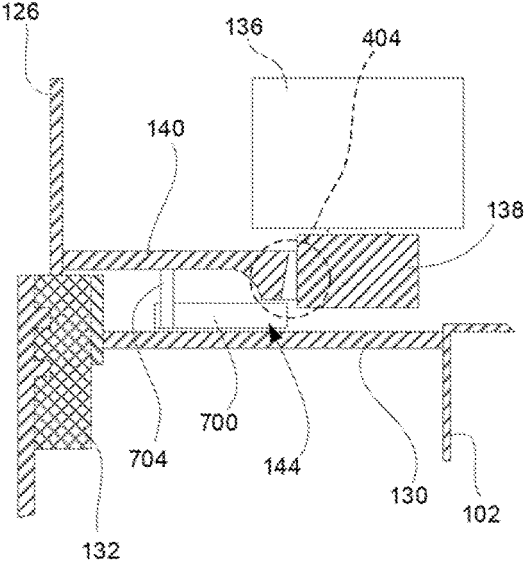
FIG. 8 is a cross-sectional elevation view of the embodiment of FIG. 7.

Referring now to FIGS. 7 and 8, in another embodiment an evacuation plate 700 may be provided on the unloader system 116. The evacuation plate 700 is mounted to the unloader, such as at an outer perimeter of the elbow tube 126 just below the driven gear 140. The evacuation plate 700 moves with the unloader system 116, and is positioned and shaped to remove debris from the location beneath the intermeshing gears 138, 140 at some point during the movement of the unloader between the first position and the second position.

For example, in FIGS. 7 and 8, the evacuation plate 700 is attached to the elbow tube and/or driven gear 138 at a location that is offset from the first axis 134 and adjacent and below the engagement location 404. It is not necessary for the evacuation plate 700 to be directly below the engagement location 404, but it is expected that being closer to or below the engagement location 404 will help clear crop material and other debris more effectively. As shown in FIG. 7, the evacuation plate 700 is located to be adjacent the engagement location 404 when the unloader system 116 is positioned in the stowed position. Alternatively, the evacuation plate 700 may be located at other locations, such as a location at which it is adjacent to the engagement location 404 when the unloader assembly 116 is in the extended position. Multiple evacuation plates, such as a supplemental evacuation plate 702 may be provided as well.

As shown in FIG. 8, the evacuation plate is locate below the driven gear 140, and above an adjacent surface of the frame 130. Thus, the evacuation plate 700 sweeps this area clear as the unloader assembly 116 rotates. The evacuation plate 700 may fill all or most of the gap between the driven gear 140 and the frame 130, but this is not strictly necessary.

The evacuation plate 700 (or plates) may be movable relative to the rest of the unloader assembly 116. For example, as shown in FIGS. 7 and 8, the evacuation plate 700 may be pivotally connected to the driven gear 140 and/or elbow tube 126 by a pivot 704. In this example, the evacuation plate is movable between an extended position in which the evacuation plate 700 extends outward from the first axis 134, and a retracted position 706 in which the evacuation plate 700 is oriented along a circumference surrounding the first axis 134. For example, the evacuation plate 700 may be curved and shaped to lie flush with the elbow tube 126 when it is in the retracted position.

The position of a movable retractor plate 700 may be controlled by a motor or solenoid, or by a linkage or other mechanism. For example, the retractor plate 700 may be connected to a cam follower that rides in a cam track on the frame 130 to position the retractor plate 700 at the desired state of extension or retraction at the desired locations along the rotation path of the unloader assembly 116. The retractor plate 700 also may be biased into one position or the other by a spring or the like. Other alternatives and variations will be apparent to persons of ordinary skill in the art in view of the present disclosure.

It will be apparent that the embodiments described herein may be used collectively or individually. For example, the embodiment of FIG. 3-5B or 6 may be used in conjunction with an evacuation plate or without an evacuation plate. Similarly, an evacuation plate may be used with or without a gear assembly having a tapered gap. However, it is expected that the combination of embodiment—i.e., the use of gears with a tapered gap and an evacuator plate—will cooperate to provide enhanced clearing of crop material and other debris from the gears.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A crop unloader comprising:
a frame;
an unloader tube mounted to the frame by a rotating joint to be movable about a first axis relative to the frame;
a driven gear fixed to the unloader tube in a plane perpendicular to the first axis and having driven teeth extending radially from the first axis;
a drive gear mounted to the frame and rotatable about a second axis that is parallel to the first axis, the drive gear having drive teeth extending radially from the second axis and extending to mesh at an engagement location with the driven teeth during rotation of the drive gear about the second axis;
a motor fixed to the frame and operatively connected to the drive gear, the motor being operable to rotate the drive gear to rotate the driven gear to move the unloader tube between a first position about the first axis and a second position about the first axis;
wherein the drive teeth and the driven teeth are configured to form a tapered gap at the engagement location, the tapered gap extending from an upper end to a lower end and being larger at the lower end than at the upper end.

2. The crop unloader of claim 1, wherein each adjacent pair of driven teeth is joined by a respective bottom land having an upper portion at a first distance from the first axis and a lower portion at a second distance from the first axis, the first distance being greater than the second distance, and the tapered gap is formed between the bottom land and a respective top land of one of the drive teeth located between the respective adjacent pair of driven teeth.

3. The crop unloader of claim 1, wherein each driven tooth comprises an inclined top land having an upper portion at a first distance from the first axis and a lower portion at a second distance from the first axis, the first distance being greater than the second distance, and the tapered gap is formed between the inclined top land and a bottom land between two adjacent drive teeth.

4. The crop unloader of claim 1, wherein the unloader tube comprises an elbow.

5. The crop unloader of claim 1, further comprising a conveyor belt positioned in the unloader tube.

6. The crop unloader of claim 1, wherein the first axis and the second axis are vertical when the frame is in a horizontal operating position.

7. The crop unloader of claim 1, further comprising an evacuation plate attached to and movable with the unloader tube, the evacuation plate being offset from the first axis, and positioned to be adjacent and below the engagement location when the unloader tube is at a predetermined position relative to the first axis.

8. The crop unloader of claim 7, wherein the evacuation plate is movably mounted to the unloader tube to be movable between an extended position in which the evacuation plate extends outward from the first axis and a retracted position in which the evacuation plate is oriented along a circumference surrounding the first axis.

9. The crop unloader of claim 8, wherein the evacuation plate is configured to be flush with an adjacent portion of the unloader tube when the evacuation plate is in the retracted position.

10. The crop unloader of claim 7, wherein the evacuation plate is located below the driven gear and an adjacent surface of the frame.

11. An agricultural combine comprising:
a chassis configured for movement on a surface;
a threshing and separating system attached to the chassis;
a hopper located on the chassis and configured to retain crop material therein;
and a crop unloader comprising:
a frame attached to the chassis;
an unloader tube mounted to the frame by a rotating joint to be movable about a first axis relative to the frame, the unloader tube being configured to receive the crop material from the hopper;
a driven gear fixed to the unloader tube in a plane perpendicular to the first axis and having driven teeth extending radially from the first axis;
a drive gear mounted to the frame and rotatable about a second axis that is parallel to the first axis, the drive gear having drive teeth extending radially from the second axis and extending to mesh at an engagement location with the driven teeth during rotation of the drive gear about the second axis;
a motor fixed to the frame and operatively connected to the drive gear, the motor being operable to rotate the drive gear to rotate the driven gear to move the unloader tube between a first position about the first axis and a second position about the first axis;
wherein the drive teeth and the driven teeth are configured to form a tapered gap at the engagement location, the tapered gap extending from an upper end to a lower end and being larger at the lower end than at the upper end.

12. The agricultural combine of claim 11, wherein each adjacent pair of driven teeth is joined by a respective bottom land having an upper portion at a first distance from the first axis and a lower portion at a second distance from the first axis, the first distance being greater than the second distance, and the tapered gap is formed between the bottom land and a respective top land of one of the drive teeth located between the respective adjacent pair of driven teeth.

13. The agricultural combine of claim 11, wherein each driven tooth comprises an inclined top land having an upper portion at a first distance from the first axis and a lower portion at a second distance from the first axis, the first distance being greater than the second distance, and the tapered gap is formed between the inclined top land and a bottom land between two adjacent drive teeth.

14. The agricultural combine of claim 11, wherein the unloader tube comprises an elbow.

15. The agricultural combine of claim 11, further comprising a conveyor belt positioned in the unloader tube.

16. The agricultural combine of claim 11, wherein the first axis and the second axis are vertical when the frame is in a horizontal operating position.

17. The agricultural combine of claim 11, further comprising an evacuation plate attached to and movable with the unloader tube, the evacuation plate being offset from the first axis, and positioned to be adjacent and below the engagement location when the unloader tube is at a predetermined position relative to the first axis.

18. The agricultural combine of claim 17, wherein the evacuation plate is movably mounted to the unloader tube to be movable between an extended position in which the evacuation plate extends outward from the first axis and a retracted position in which the evacuation plate is oriented along a circumference surrounding the first axis.

19. The agricultural combine of claim 18, wherein the evacuation plate is configured to be flush with an adjacent portion of the unloader tube when the evacuation plate is in the retracted position.

20. The agricultural combine of claim 17, wherein the evacuation plate is located below the driven gear and an adjacent surface of the frame.

* * * * *